(12) United States Patent
Silverman et al.

(10) Patent No.: US 12,388,500 B2
(45) Date of Patent: Aug. 12, 2025

(54) TRIGGERING STAGGERED MULTI-USER UPLINK IN AMBIENT POWER DEVICE GROUP

(71) Applicant: Cisco Technology, Inc., San Jose, CA (US)

(72) Inventors: Matthew A. Silverman, Shaker Heights, OH (US); Robert E. Barton, Richmond (CA); Ashish Sheikh, Akron, OH (US)

(73) Assignee: Cisco Technology, Inc.

( * ) Notice: Subject to any disclaimer, the term of this patent is extended or adjusted under 35 U.S.C. 154(b) by 0 days.

(21) Appl. No.: 18/457,558

(22) Filed: Aug. 29, 2023

(65) Prior Publication Data

US 2024/0380445 A1 Nov. 14, 2024

Related U.S. Application Data

(60) Provisional application No. 63/501,783, filed on May 12, 2023.

(51) Int. Cl.
  *H04L 23/02* (2006.01)
  *H04B 7/0452* (2017.01)
  *H04B 7/22* (2006.01)

(52) U.S. Cl.
  CPC ............ *H04B 7/0452* (2013.01); *H04B 7/22* (2013.01)

(58) Field of Classification Search
  CPC .... H04W 72/04; H04W 72/23; H04B 7/0452; H04B 7/022; H04L 1/1812; H04L 2001/0097; H04L 5/0035

(Continued)

(56) References Cited

U.S. PATENT DOCUMENTS

2010/0157901 A1* 6/2010 Sanderovitz ........... H04B 7/022
  370/328
2016/0285591 A1* 9/2016 Dortmund ............. H04L 1/1877
(Continued)

FOREIGN PATENT DOCUMENTS

WO 2022170247 A1 8/2022
WO 2022170267 A1 8/2022

OTHER PUBLICATIONS

Dunna M., et al., "SyncScatter: Enabling WiFi like Synchronization and Range for WiFi Backscatter Communication", USENIX, The Advanced Computing Systems Association, Apr. 12, 2021, pp. 923-937, XP061067917, Retrieved from http://www.usenix.org/sites/default/files/nsdi21_full-proceedings_interior.pdf on Apr. 12, 2021, Sections 3.3 and 3.4.

(Continued)

*Primary Examiner* — Khai Tran
(74) *Attorney, Agent, or Firm* — Merchant & Gould P.C.

(57) ABSTRACT

Staggered Multi-User (MU) uplink in an Ambient Power (AMP) Backscatter Device (BKD) group may be provided. A transmitter AP may determine to receive uplink data from an AMP BKD group and then transmit a session initialization message to a receiver AP instructing the receiver AP to receive the uplink data from the AMP BKD group. The transmitter AP may receive an initialization response from the receiver AP indicating the receiver AP will receive the uplink data. The transmitter may transmit an AMP BKD initialization signal to the AMP BKD group indicating to the AMP BKD group to perform scattering without collisions. The transmitter AP may then transmit an excitation transmission for the AMP BKD group to perform scattering.

20 Claims, 4 Drawing Sheets

(58) Field of Classification Search
USPC .......................................... 375/262, 260, 267
See application file for complete search history.

(56) References Cited

U.S. PATENT DOCUMENTS

| | | |
|---|---|---|
| 2017/0125892 A1 | 5/2017 | Arbabian et al. |
| 2020/0204251 A1 | 6/2020 | Kim et al. |
| 2022/0159671 A1 | 5/2022 | Kim et al. |
| 2024/0306098 A1* | 9/2024 | MolavianJazi ..... H04W 52/365 |
| 2024/0323988 A1* | 9/2024 | Elshafie .................. H02J 50/40 |

OTHER PUBLICATIONS

International Search Report and Written Opinion for International Application No. PCT/US2024/028687, mailed Sep. 3, 2024, 16 Pages.

Katanbaf M., et al., "MultiScatter: Multistatic Backscatter Networking for Battery-Free Sensors", Proceedings of the 17th International Conference on Emerging Networking Experiments and Technologies, ACMPUB27, New York, NY, USA, Nov. 15-17, 2021, pp. 69-83, XP058778334, Section 3.1.

* cited by examiner

TRIGGERING STAGGERED MULTI-USER UPLINK IN AMBIENT POWER DEVICE GROUP

RELATED APPLICATION

Under provisions of 35 U.S.C. § 119(e), Applicant claims the benefit of U.S. Provisional Application No. 63/501,783, filed May 12, 2023, which is incorporated herein by reference.

TECHNICAL FIELD

The present disclosure relates generally to providing staggered Multi-User (MU) uplink in an Ambient Power (AMP) Backscatter Device (BKD) group.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
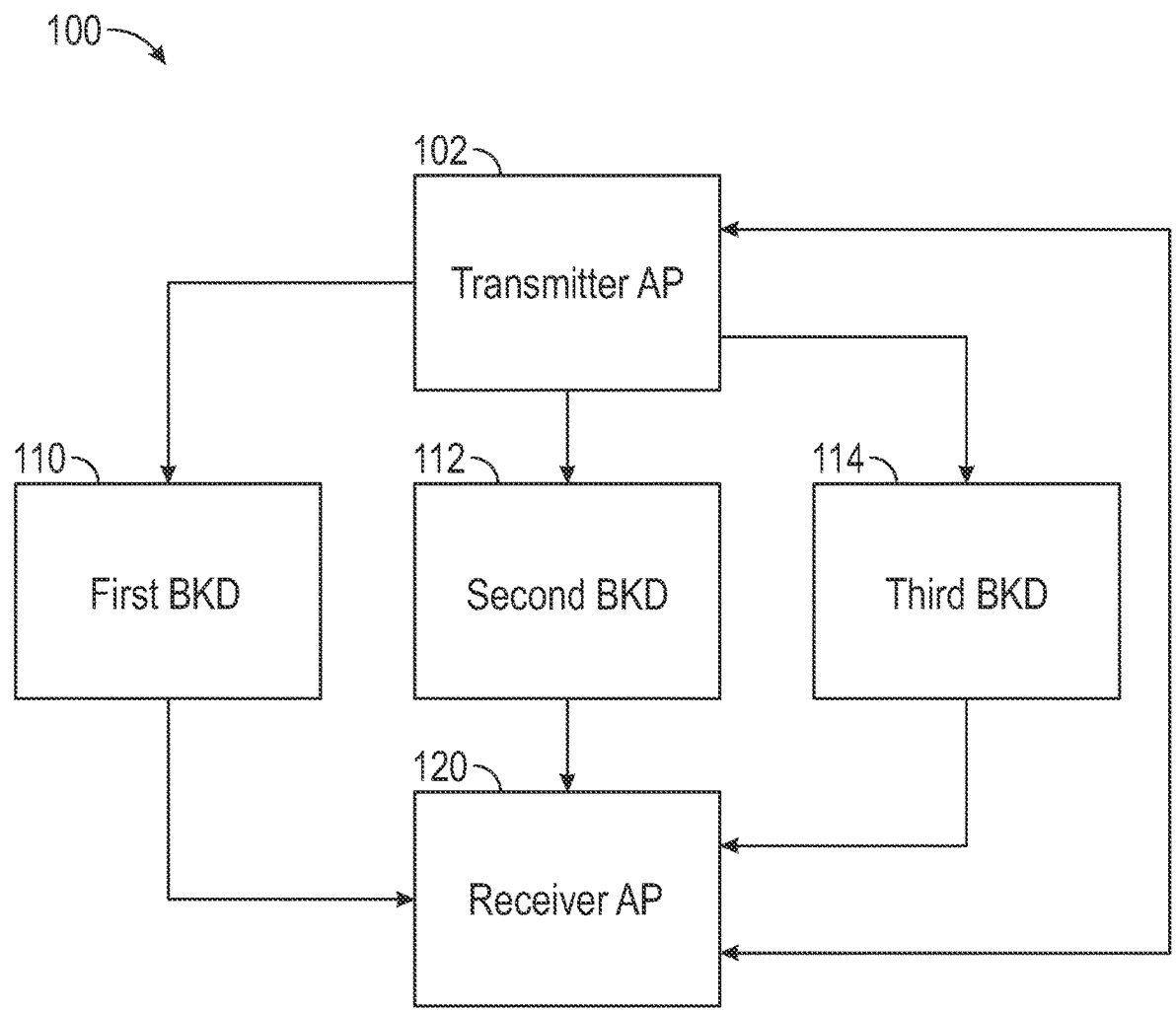
FIG. 1 is a block diagram of an operating environment for triggering staggered Multi-User (MU) uplink in an Ambient Power (AMP) Backscatter Device (BKD) group.

Staggered Multi-User (MU) uplink in an Ambient Power (AMP) Backscatter Device (BKD) group may be provided. A transmitter AP may determine to receive uplink data from an AMP BKD group and then transmit a session initialization message to a receiver AP instructing the receiver AP to receive the uplink data from the AMP BKD group. The transmitter AP may receive an initialization response from the receiver AP indicating the receiver AP will receive the uplink data. The transmitter may transmit an AMP BKD initialization signal to the AMP BKD group indicating to the AMP BKD group to perform scattering without collisions. The transmitter AP may then transmit an excitation transmission for the AMP BKD group to perform scattering.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Ambient Power (AMP) Backscatter Devices (BKDs) can use Radio Frequency (RF) signals to transmit data without a power source such as a battery or a connection to electricity. AMP BKDs can be Internet of Things (IoT) devices in some examples. The AMP BKDs may use an antenna to receive a RF signal, use the RF signal for excitation (e.g., convert the RF signal into electricity), and use the power to modify and reflect the RF signal with data. In some examples, the AMP BKDs modulate or otherwise modify the RF signal to include encoded data. Other devices can receive a reflected RF signal transmitted by an AMP BKD to determine the data the AMP BKD is sending. AMP BKD operations may be described in documents and standards from the Institute of Electrical and Electronics Engineers (IEEE). For example, the IEEE AMP topic interest group and the IEEE 802.11 standard may describe the operations of AMP BKDs.

For AMP BKD traffic, it is critical to avoid collisions between multiple BKDs. If multiple BKDs are performing scattering (i.e., signal modulation and reflection), such as amplitude shift keying (e.g., on-off keying), at the same time, the receivers (i.e., the devices that are receiving the signals from the BKDs) may be unable to decode the signals and/or only the strongest signal the receivers receive may be properly heard for decoding, drowning out the other BKD signals. For example, a −70 Decibel Milliwatt (dBm) signal from a first AMP BKD and a −66 dBm signal from a second AMP BKD may be drowned out by a −50 dBm signal from a third AMP BKD.

FIG. 1 is a block diagram of an operating environment 100 for triggering staggered Multi-User (MU) uplink in an AMP BKD group. The operating environment 100 may include a transmitter Access Point (AP) 102, a first AMP BKD 110, a second AMP BKD 112, a third AMP BKD 114, and a receiver AP 120. The transmitter AP 102 and the receiver AP 120 may be devices that can send and receive signals to provide a connection to a network. The first AMP BKD 110, the second AMP BKD 112, and the third AMP BKD 114 may be devices that can utilize the signals the transmitter AP 102, the receiver AP 120, and/or other devices transmit to generate power, modulate or otherwise modify the received signals to encode data, and reflect the modulated signals. The first AMP BKD 110, the second AMP BKD 112, and the third AMP BKD 114 may be user devices, IoT devices, sensors, and/or the like. The AMP BKD group includes the first AMP BKD 110, the second AMP BKD 112, and the third AMP BKD 114, but there may be more or fewer AMP BKDs in other examples. Additionally, there may be more or fewer transmitter APs and/or receiver APs in other examples.

When the first AMP BKD 110, the second AMP BKD 112, and the third AMP BKD 114 are performing signal scattering concurrently or nearly concurrently, the receiver AP 120 may be unable to decode the reflected signals because of signal interference. Alternatively, a stronger signal from one of the AMP BKDs may drown out the other reflected signals, and the receiver AP 120 may only receive the stronger signal. For example, the first AMP BKD 110 may reflect a signal stronger than the signals the second AMP BKD 112 and the third AMP BKD 114 reflect, and the receiver AP 120 may only receiver the signal from the first AMP BKD 110 because the stronger signal drowns out the signals from the second AMP BKD 112 and the third AMP BKD 114.

The transmitter AP 102 may establish the first AMP BKD 110, the second AMP BKD 112, and the third AMP BKD 114 as a MU group of AMP BKDs, also referred to as an AMP BKD group herein. The transmitter AP 102 may communicate to AMP BKDs that the device is a device Nin a group M. For example, the transmitter AP 102 may assign the first AMP BKD 110 as the first device of a first AMP BKD group, the second AMP BKD 112 as a second device of the first AMP BKD group, and the third AMP BKD 114 as a third device of the first AMP BKD group. Thus, the transmitter AP 102 may create any number of AMP BKD groups with any number of devices. In some examples, AMP BKDs can be assigned to multiple groups. Thus, the AMP BKD in multiple groups will perform scattering when the transmitter AP 102 indicates that a group the AMP BKD belongs to should perform scattering.

The transmitter AP 102 may then control the times the first AMP BKD 110, the second AMP BKD 112, and the third AMP BKD 114 can modulate and reflect signals to prevent signal interference that prevents the receiver AP 120 from decoding signals and/or from receiving signals. For example, the transmitter AP 102 may determine to pull uplink data from the group of AMP BKDs and send a trigger to indicate to the AMP BKD group perform scattering and an order to perform the scattering. For example, the transmitter AP 102 may send a trigger to cause the first AMP BKD 110 to perform scattering first, the second AMP BKD 112 to perform scattering second, and the third AMP BKD 114 to perform scattering third. The trigger may also define a period of time the AMP BKDs can perform the scattering. The transmitter AP 102 may then transmit an excitation transmission for AMP BKD excitation for a time period to allow the first AMP BKD 110, the second AMP BKD 112, and the third AMP BKD 114 to perform scattering in the indicated order.

In another example, the AMP BKDs may have an order established before the transmitter AP 102 sends a trigger to indicate to the AMP BKD group to perform scattering. For example, a network controller (e.g., a Wireless Local Area Network (WLAN) controller) may set or otherwise instruct the AMP BKD group to perform scattering in an order whenever a trigger is received, such as the first AMP BKD 110 to perform scattering first, the second AMP BKD 112 to perform scattering second, and the third AMP BKD 114 to perform scattering third. Thus, when the transmitter AP 102 determines to pull uplink data from the AMP BKD group and sends a trigger, the AMP BKD group can be prepared to perform scattering in the assigned order. The transmitter AP 102 may then send an excitation transmission for BKD excitation, and the AMP BKD group may perform scattering in the assigned order while the transmitter AP 102 transmits the excitation transmission.

The transmitter AP 102 may not directly receive the signals from the first AMP BKD 110, the second AMP BKD 112, and the third AMP BKD 114. Therefore, the transmitter AP 102 may send a message to the receiver AP 120 instructing the receiver AP 120 to receive the transmissions from the AMP BKDs before the transmitter AP 102 sends the trigger to instruct the AMP BKDs to perform scattering. The message to the receiver AP 120 may include the size of the AMP BKD group (e.g., three AMP BKDs) and/or the timing of the transmissions the AMP BKDs will send the transmissions. Thus, the receiver AP 120 may know when to receive the AMP transmissions and identify which transmission is associated with which AMP BKD. For example, the transmitter AP 102 may send a message to the receiver AP 120 that the three AMP BKDs will be transmitting and the order the transmissions occur will be the first AMP BKD 110 first, the second AMP BKD 112 next, and the third AMP BKD 114 last. The receiver AP 120 may then receive the three transmissions in the specified order.

Once the receiver AP 120 receives the transmissions from the AMP BKD group, the receiver AP 120 may send a response to the members of the AMP BKD group (e.g., the first AMP BKD 110, the second AMP BKD 112, and the third AMP BKD 114) to acknowledge that the transmissions were received, such as a Block Acknowledge (BA). The receiver AP 120 may then send the transmissions to a device that wants to evaluate the data, such as the transmitter AP 102. In another example, the receiver AP 120 may relay the received transmissions to the transmitter AP 102. When the transmitter AP 102 receives the transmissions from the receiver AP 120, the transmitter AP 102 may send a response (e.g., a BA) to the members of the AMP BKD group.

Figure 2:
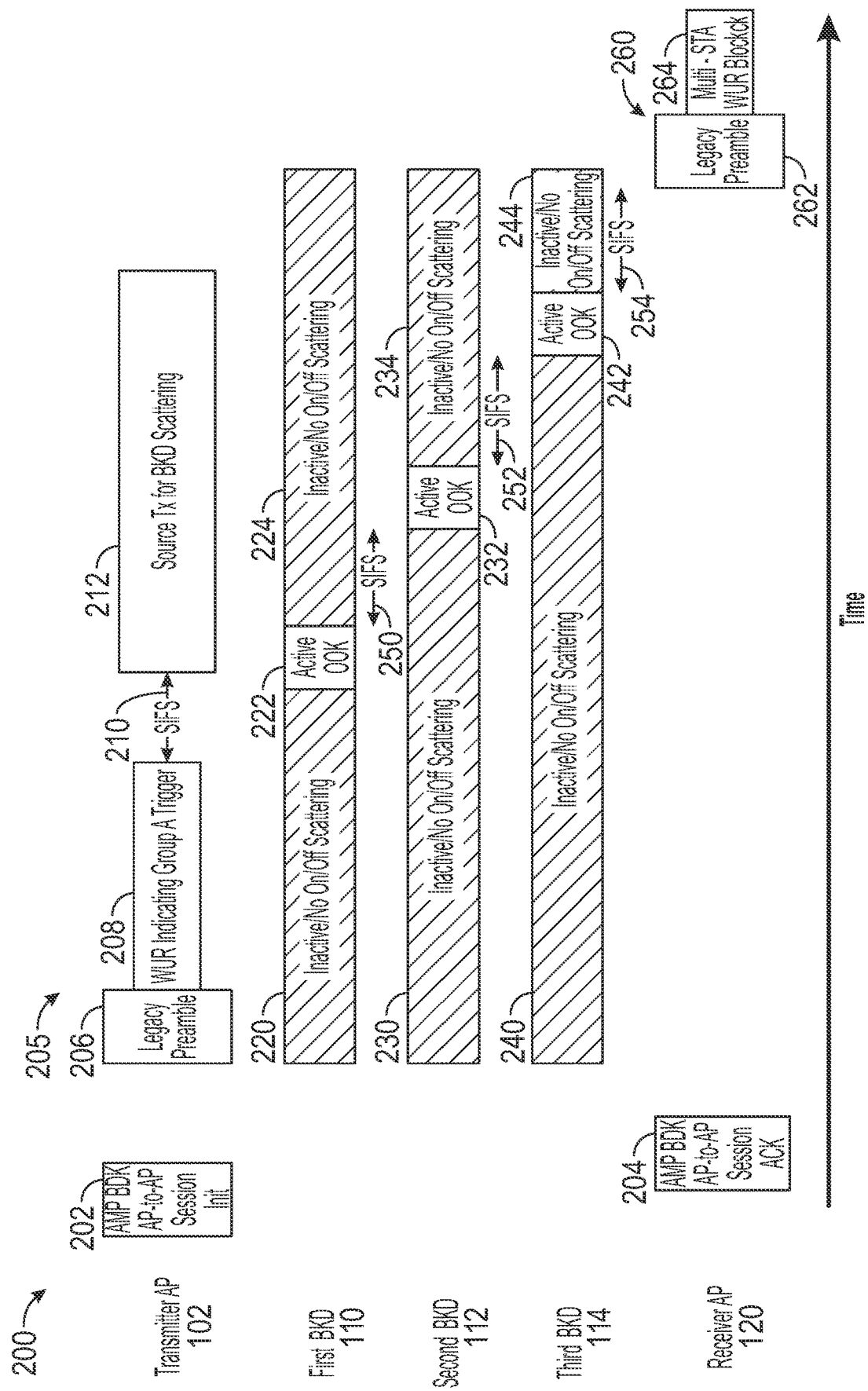
FIG. 2 is a block diagram of a signal process for triggering staggered MU uplink in an AMP BKD group.

FIG. 2 is a block diagram of a signal process 200 for triggering staggered MU uplink in an AMP BKD group. The signal process 200 includes the transmitter AP 102, the first AMP BKD 110, the second AMP BKD 112, the third AMP BKD 114, and the receiver AP 120. The signal process 200 may begin when the transmitter AP 102 determines to receive uplink data from an AMP BKD group including the first AMP BKD 110 the second AMP BKD 112, and the third AMP BKD 114.

The transmitter AP 102 may begin the signal process 200 by sending a session initialization message 202 to the receiver AP 120. The session initialization message 202 may inform the receiver AP 120 to receive signals from AMP BKDs, that the transmitter AP 102 is going to send an excitation signal for a group of AMP BKDs to perform scattering, the size of the group of AMP BKDs, when the excitation signal will be transmitted, the order of the AMP BKDs, and/or the like. For example, the session initialization message 202 may indicate that the AMP BKD group includes three devices (i.e., the first AMP BKD 110, the second AMP BKD 112, and the third AMP BKD 114), the timing of the excitation signal, the order of the AMP BKDs (i.e., the first AMP BKD 110 transmitting first, the second AMP BKD 112 transmitting second, and the third AMP BKD 114 transmitting third), and/or the like. The timing of the AMP BKD scattering may include a period each AMP BKD can perform scattering and delays between the periods reserved for scattering to avoid collisions between the AMP BKDs. For example, the periods the AMP BKDs can perform scattering and the delays may be based on the period of the excitation transmission, the number of AMP BKDs that should transmit, and/or the like. The receiver AP 120 may send an initialization response 204 back to the transmitter AP 102. The initialization response 204 may be an Acknowledge (ACK) signal that indicates to the transmitter AP 102 that the receiver AP 120 will receive the signals transmitted by the AMP BKD group.

Once the receiver AP 120 sends the initialization response 204, the transmitter AP 102 may send an AMP BKD initialization signal 205 to the AMP BKD group the transmitter AP 102 determines to receive uplink data from, including the first AMP BKD 110, the second AMP BKD 112, the third AMP BKD 114. The AMP BKD initialization signal 205 may include a legacy preamble 206 and a trigger 208. The legacy preamble 206 may be a legacy preamble as described by the IEEE 802.11 standard and may include one or more fields such as a Legacy Short Training Field (L-STF), a Legacy Long Training Field (L-LTF), and a Legacy Signal Field (L-SIG). When an AMP BKD receives a L-STF, the AMP BKD may determine to begin packet detection, perform automatic gain control, perform frequency offset estimation, perform initial time synchronization, and/or the like. When an AMP BKD receives a L-LTF, the AMP BKD may perform channel estimation, perform a more accurate frequency offset estimation compared to the estimation performed when the S-LTF is received, perform more accurate time synchronization compared to the estimation performed when the S-LTF is received, and/or the like. When an AMP BKD receives a L-SIG, the AMP BKD may determine packet information for the received configuration such as data rate, data length, transmission time, and/or the like.

The trigger 208 may indicate to the AMP BKD group to perform scattering and indicate an order to perform the scattering. For example, the trigger 208 may indicate that the first AMP BKD 110 will perform scattering first, the second AMP BKD 112 will perform scattering second, and the third AMP BKD 114 will perform scattering third. The trigger 208 may also define a period of time the AMP BKDs can perform the scattering (e.g., the period the transmitter AP 102 will transmit an excitation transmission) and delays between the periods defined for performing scattering. In another example, the AMP BKD group may have an order established before the transmitter AP 102 sends the trigger 208. For example, before the signal process 200, a network controller or the transmitter AP 102 may set or otherwise instruct the AMP BKD group to perform scattering in an order whenever a trigger is received, such as the trigger 208. Thus, the AMP BKD group may be prepared to perform scattering in the assigned order when the trigger 208 is received. The trigger 208 may be a Wake-Up Receiver (WUR) signal as described by the IEEE 802.11ba standard. In response to receiving the trigger 208, the first AMP BKD 110, the second AMP BKD 112, and the third AMP BKD 114 may be prepared to perform scattering at in the assigned order when the first AMP BKD 110, the second AMP BKD 112, and the third AMP BKD 114 receive an excitation transmission.

After sending the AMP BKD initialization signal 205, the transmitter AP 102 may delay sending an excitation transmission for a first delay period 210. The transmitter AP 102 may delay for the first delay period 210 to prevent collisions between the AMP BKD initialization signal 205 and the excitation transmission and/or other signals. The first delay period 210 and/or other delay periods in the signal process 200 may be Short Interframe Spaces (SIFS). After the first delay period 210, the transmitter AP 102 may send an excitation transmission 212. The excitation transmission 212 may be any signal appropriate for AMP BKD excitation. For example, the excitation transmission 212 may be a single CW tone, multiple CW tones at specific frequencies, a symbol similar to a L-LTF that cyclically repeats with specific subcarriers populated, and the like.

As described above, the first AMP BKD 110 may determine to perform scattering first, based on initialization before the signal process 200 or based on the AMP BKD initialization signal 205, when the first AMP BKD 110 receives the excitation transmission 212. Therefore, the first AMP BKD 110 is inactive for an initial first AMP BKD inactive period 220 during the transmission of the AMP BKD initialization signal 205 and during the first delay period 210. The first AMP BKD 110 may be inactive and not perform scattering during the initial first AMP BKD inactive period 220. Once the first AMP BKD 110 receives the excitation transmission 212, the first AMP BKD 110 may perform a first scattering 222. The first AMP BKD 110 may then return to an inactive state during a subsequent first AMP BKD inactive period 224.

Similarly, the second AMP BKD 112 may determine to perform scattering after the first AMP BKD 110 based on initialization before the signal process 200 or based on the AMP BKD initialization signal 205. The second AMP BKD 112 may also determine a second delay period 250 to wait after the first scattering 222 based on initialization before the signal process 200 or based on the AMP BKD initialization signal 205. Therefore, the second AMP BKD 112 may be inactive for an initial second AMP BKD inactive period 230 during the transmission of the AMP BKD initialization signal 205, the first delay period 210, the first scattering 222, and the second delay period 250. After the second delay period 250, the second AMP BKD 112 may perform a second scattering 232. The second AMP BKD 112 may then return to an inactive state during a subsequent second AMP BKD inactive period 234.

The third AMP BKD 114 may determine to perform scattering after the second AMP BKD 112 based on initialization before the signal process 200 or based on the AMP BKD initialization signal 205. The third AMP BKD 114 may also determine a third delay period 252 to wait after the second scattering 232 based on initialization before the signal process 200 or based on the AMP BKD initialization signal 205. Therefore, the third AMP BKD 114 may be inactive for an initial third AMP BKD inactive period 240 during the transmission of the AMP BKD initialization signal 205, the first delay period 210, the first scattering 222, the second delay period 250, the second scattering 232, and the third delay period 252. After the third delay period 252, the third AMP BKD 114 may perform a third scattering 242. The third AMP BKD 114 may then return to an inactive state during a subsequent third AMP BKD inactive period 244.

The receiver AP 120 may receive modulated or otherwise modified signals from the first AMP BKD 110 via the first scattering 222, from the second AMP BKD 112 via the second scattering 232, and from the third AMP BKD 114 via the third scattering 242, the receiver AP 120 may delay for a fourth delay period 254 to avoid collisions. After the fourth delay period 254, the receiver AP 120 may send an AMP BKD scattering response 260 to the first AMP BKD 110, the second AMP BKD 112, and the third AMP BKD 114. The AMP BKD scattering response 260 may include a second legacy preamble 262 and a scattering response signal 264. The second legacy preamble 262 may be a legacy preamble similar to the legacy preamble 206. The scattering response signal 264 may be a signal that notifies the first AMP BKD 110, the second AMP BKD 112, and the third AMP BKD 114 that the scattering was successful and the signals were received. The scattering response signal 264 may be a BA, a WUR, and/or the like.

Figure 3:
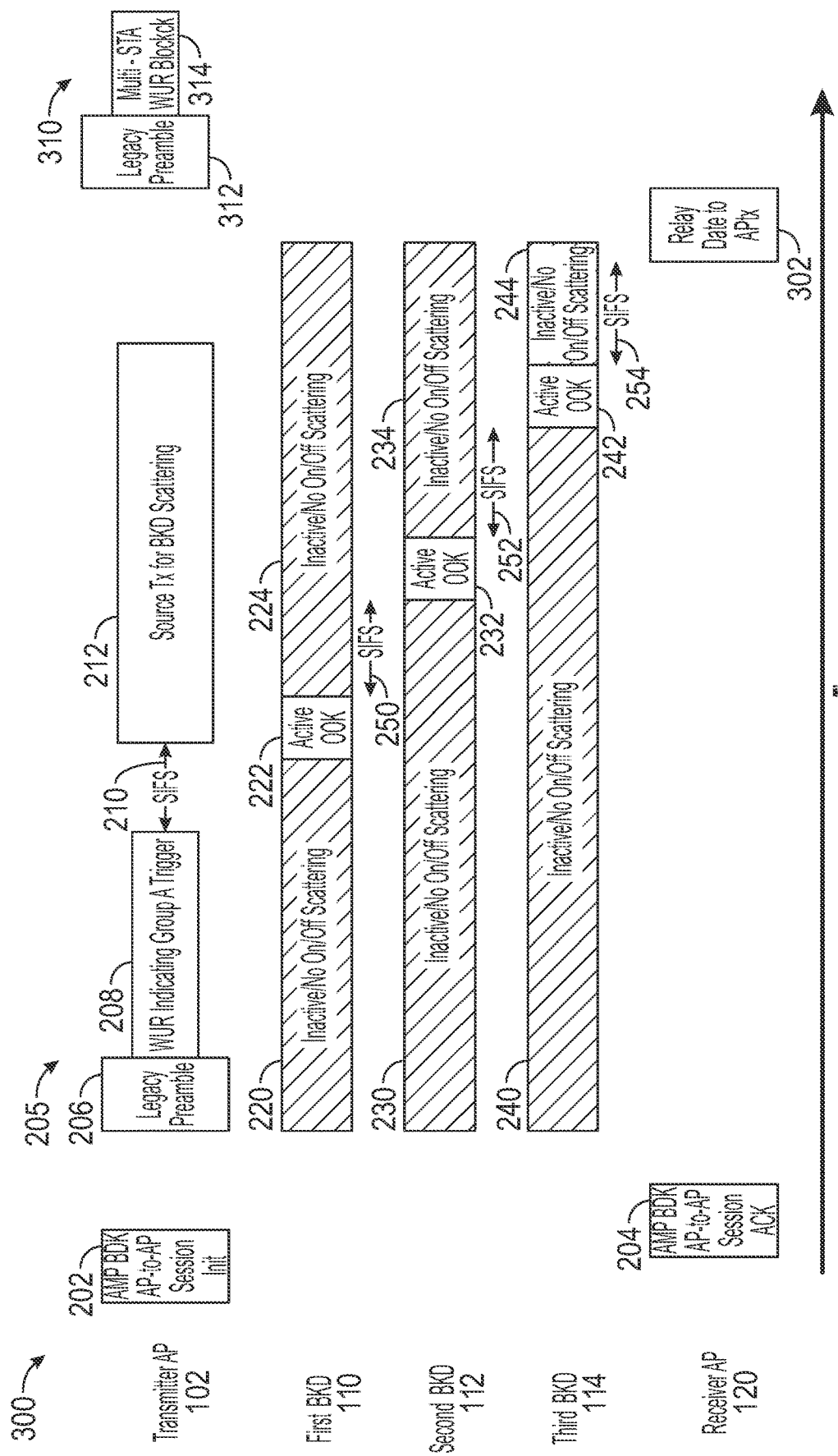
FIG. 3 is a block diagram of a second signal process for triggering staggered MU uplink in an AMP BKD group.

FIG. 3 is a block diagram of a second signal process 300 for triggering staggered MU uplink in an AMP BKD group. The second signal process 300 is similar to the signal process 200 and includes the session initialization message 202, the initialization response 204, the AMP BKD initialization signal 205 with the legacy preamble 206 and the trigger 208, the first delay period 210, the excitation transmission 212, the initial first AMP BKD inactive period 220, the first scattering 222, the subsequent first AMP BKD inactive period 224, the initial second AMP BKD inactive period 230, the second delay period 250, the second scattering 232, the subsequent first AMP BKD inactive period 234, the initial third AMP BKD inactive period 240, the third delay period 252, the third scattering 242, the subsequent third AMP BKD inactive period 244, and the fourth delay period 254, as described above.

However, the second signal process does not include the receiver AP 120 sending the AMP BKD scattering response 260. Instead, the receiver AP 120 may transmit the data received from the first AMP BKD 110, the second AMP BKD 112, and the third AMP BKD 114 to the transmitter AP 102 with the data transmission signal 302. Then, the transmitter AP 102 may send a transmitter AP AMP BKD scattering response 310 to the first AMP BKD 110, the second AMP BKD 112, and the third AMP BKD 114. The transmitter AP AMP BKD scattering response 310 may include a third legacy preamble 312 and a second scattering response signal 314. The third legacy preamble 312 may be a legacy preamble similar to the legacy preamble 206. The second scattering response signal 314 may be a signal that notifies the first AMP BKD 110, the second AMP BKD 112, and the third AMP BKD 114 that the scattering was successful, and the transmitter AP 102 received the signals from the first AMP BKD 110, the second AMP BKD 112, and the third AMP BKD 114. The second scattering response signal 314 may be a BA, a WUR, and/or the like.

Figure 4:
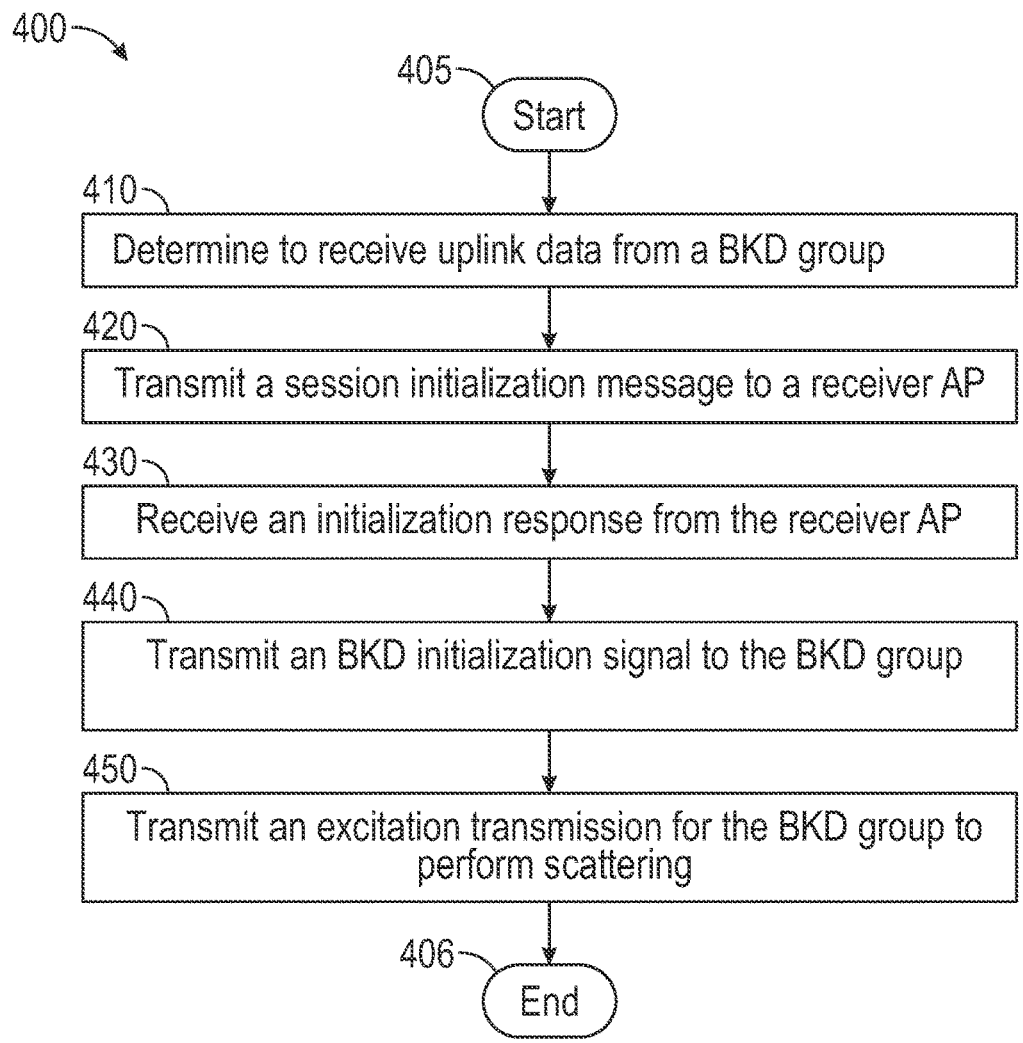
FIG. 4 is a flow chart of a method for triggering staggered MU uplink in an AMP BKD group.

FIG. 4 is a flow chart of a method 400 for triggering staggered MU uplink in an AMP BKD group. The method 400 may begin at starting block 405 and proceed to operation 410. In operation 410, it may be determined to receive uplink data from an AMP BKD group. For example, the transmitter AP 102 may determine to receive uplink data from an AMP BKD group including the first AMP BKD 110, the second AMP BKD 112, and the third AMP BKD 114.

In operation 420, a session initialization message may be transmitted to a receiver AP. For example, the transmitter AP 102 may send the session initialization message 202 to the receiver AP 120 instructing the receiver AP 120 to receive the uplink data from the AMP BKD group. The session initialization message 202 is described in more detail above.

In operation 430, an initialization response may be received from the receiver AP. For example, the transmitter AP 102 receives the initialization response 204 from the receiver AP 120 indicating the receiver AP 120 will receive the uplink data. The initialization response 204 is described in more detail above.

In operation 440, an AMP BKD initialization signal may be transmitted to the AMP BKD group. For example, the transmitter AP 102 transmits the AMP BKD initialization signal 205 to the AMP BKD group (i.e., the first AMP BKD 110, the second AMP BKD 112, and the third AMP BKD 114), indicating to the AMP BKD group to perform scattering without collisions. The AMP BKD initialization signal 205 may specify an order for the AMP BKDs to perform scattering and/or delay periods to wait before performing scattering after another AMP BKD has performed scattering. The AMP BKD initialization signal 205 is described in more detail above.

In operation 450, an excitation transmission may be transmitted for the AMP BKD group to perform scattering. For example, the transmitter AP 102 may transmit the excitation transmission 212, and the AMP BKD group may perform the scattering in the assigned order. The excitation transmission 212 and the scattering is described in more detail above. The method 400 may conclude at ending block 460.

Figure 5:
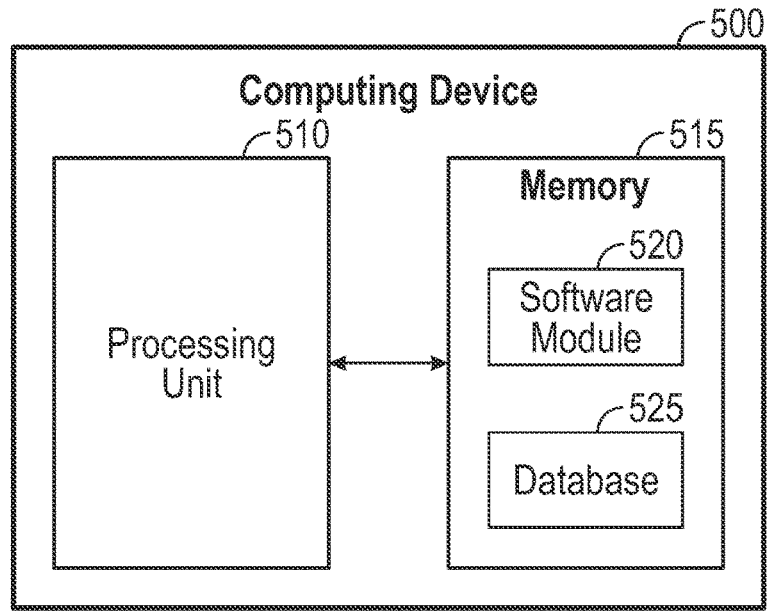
FIG. 5 is a block diagram of a computing device.

FIG. 5 is a block diagram of a computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for triggering staggered MU uplink in an AMP BKD group with respect to FIG. 1, FIG. 2, FIG. 3, and FIG. 4. Computing device 500, for example, may provide an operating environment for the transmitter AP 102, the first AMP BKD 110, the second AMP BKD 112, the third AMP BKD 114, the receiver AP 120, and the like. The transmitter AP 102, the first AMP BKD 110, the second AMP BKD 112, the third AMP BKD 114, the receiver AP 120, and the like may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general-purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   determining to receive uplink data from an Ambient Power (AMP) Backscatter Device (BKD) group;
   transmitting a session initialization message to a receiver Access Point (AP) instructing the receiver AP to receive the uplink data from the AMP BKD group;
   receiving an initialization response from the receiver AP indicating the receiver AP will receive the uplink data;
   transmitting an AMP BKD initialization signal to the AMP BKD group indicating to the AMP BKD group to perform scattering without collisions; and
   transmitting an excitation transmission for the AMP BKD group to perform scattering.

2. The method of claim 1, further comprising:
   receiving the uplink data from the receiver AP; and
   transmitting a scattering response to the AMP BKD group.

3. The method of claim 1, further comprising delaying transmitting the excitation transmission after a delay period.

4. The method of claim 1, wherein the session initialization message indicates to the receiver AP any one of (i) an AMP BKD group size, (ii) a time the excitation transmission will be transmitted, (iii) an AMP BKD group order, or (iv) any combination of (i)-(iii).

5. The method of claim 1, wherein the AMP BKD initialization signal indicates to the AMP BKD group any one of (i) an order to perform scattering, (ii) delay periods to delay after an AMP BKD of the AMP BKD group performs scattering, or (iii) a combination of (i) and (ii).

6. The method of claim 1, wherein the AMP BKD initialization signal indicates to the AMP BKD group an order to perform scattering, causing the AMP BKD group to perform scattering in the order during the transmitting of the excitation transmission.

7. The method of claim 1, further comprising:
   receiving, by the receiver AP, the uplink data; and
   transmitting, by the receiver AP, a scattering response to the AMP BKD group.

8. A system comprising:
   a memory storage; and
   a processing unit coupled to the memory storage, wherein the processing unit is operative to:
     determine to receive uplink data from an Ambient Power (AMP) Backscatter Device (BKD) group;
     transmit a session initialization message to a receiver Access Point (AP) instructing the receiver AP to receive the uplink data from the AMP BKD group;
     receive an initialization response from the receiver AP indicating the receiver AP will receive the uplink data;

transmit an AMP BKD initialization signal to the AMP BKD group indicating to the AMP BKD group to perform scattering without collisions; and transmit an excitation transmission for the AMP BKD group to perform scattering.

9. The system of claim 8, the processing unit being further operative to:

receive the uplink data from the receiver AP; and transmit a scattering response to the AMP BKD group.

10. The system of claim 8, the processing unit being further operative to:

delay transmitting the excitation transmission after a delay period.

11. The system of claim 8, wherein the session initialization message indicates to the receiver AP any one of (i) an AMP BKD group size, (ii) a time the excitation transmission will be transmitted, (iii) an AMP BKD group order, or (iv) any combination of (i)-(iii).

12. The system of claim 8, wherein the AMP BKD initialization signal indicates to the AMP BKD group any one of (i) an order to perform scattering, (ii) delay periods to delay after an AMP BKD of the AMP BKD group performs scattering, or (iii) a combination of (i) and (ii).

13. The system of claim 8 wherein the AMP BKD initialization signal indicates to the AMP BKD group an order to perform scattering, causing the AMP BKD group to perform scattering in the order during the transmitting of the excitation transmission.

14. The system of claim 8, the processing unit being further operative to:

receive the uplink data from the receiver AP.

15. A non-transitory computer-readable medium that stores a set of instructions which when executed perform a method executed by the set of instructions comprising:

determining to receive uplink data from an Ambient Power (AMP) Backscatter Device (BKD) group;

transmitting a session initialization message to a receiver Access Point (AP) instructing the receiver AP to receive the uplink data from the AMP BKD group;

receiving an initialization response from the receiver AP indicating the receiver AP will receive the uplink data;

transmitting an AMP BKD initialization signal to the AMP BKD group indicating to the AMP BKD group to perform scattering without collisions; and transmitting an excitation transmission for the AMP BKD group to perform scattering.

16. The non-transitory computer-readable medium of claim 15, the method executed by the set of instructions further comprising:

receiving the uplink data from the receiver AP; and transmitting a scattering response to the AMP BKD group.

17. The non-transitory computer-readable medium of claim 15, the method executed by the set of instructions further comprising:

transmitting the excitation transmission after a delay period.

18. The non-transitory computer-readable medium of claim 15, wherein the session initialization message indicates to the receiver AP any one of (i) an AMP BKD group size, (ii) a time the excitation transmission will be transmitted, (iii) an AMP BKD group order, or (iv) any combination of (i)-(iii).

19. The non-transitory computer-readable medium of claim 15, wherein the AMP BKD initialization signal indicates to the AMP BKD group any one of (i) an order to perform scattering, (ii) delay periods to delay after an AMP BKD of the AMP BKD group performs scattering, or (iii) a combination of (i) and (ii).

20. The non-transitory computer-readable medium of claim 15, wherein the AMP BKD initialization signal indicates to the AMP BKD group an order to perform scattering, causing the AMP BKD group to perform scattering in the order during the transmitting of the excitation transmission.

* * * * *